Nov. 24, 1970   G. H. LOCKWOOD   3,543,013
IRRIGATION HEAD
Filed Jan. 17, 1968

Inventor
George H. Lockwood

United States Patent Office 3,543,013
Patented Nov. 24, 1970

3,543,013
IRRIGATION HEAD
George H. Lockwood, 2125 NE. 27th Drive, Wilton Manors, Fort Lauderdale, Fla. 33306
Filed Jan. 17, 1968, Ser. No. 698,479
Int. Cl. B05b 3/02
U.S. Cl. 239—230                     3 Claims

ABSTRACT OF THE DISCLOSURE

An irrigation head of the impact arm type having the arm pivot spindle in the form of a piston. When operating water pressure is applied, the resulting motion of the arm pivot spindle causes the impact arm to be raised. The impact arm is so shaped that in the inoperative position a projection from the arm covers the discharge orifice of the nozzle. When the impact arm is raised to the operating position the nozzle orifice becomes unobstructed.

---

It is an object of the invention to provide an irrigation head in which the discharge nozzle orifice will be covered and closed against the admission of foreign material and insects at all times during which the head is inoperative but said orifice will be automatically uncovered for operation.

With this and other objects in view, as will be apparent to those skilled in the art, the invention resides in the combination of parts set forth in the specifications and covered by the claims appended hereto.

The character of the invention may be best understood by reference to one of its structural forms as illustrated by the accompanying drawings in which.

Figure 1:
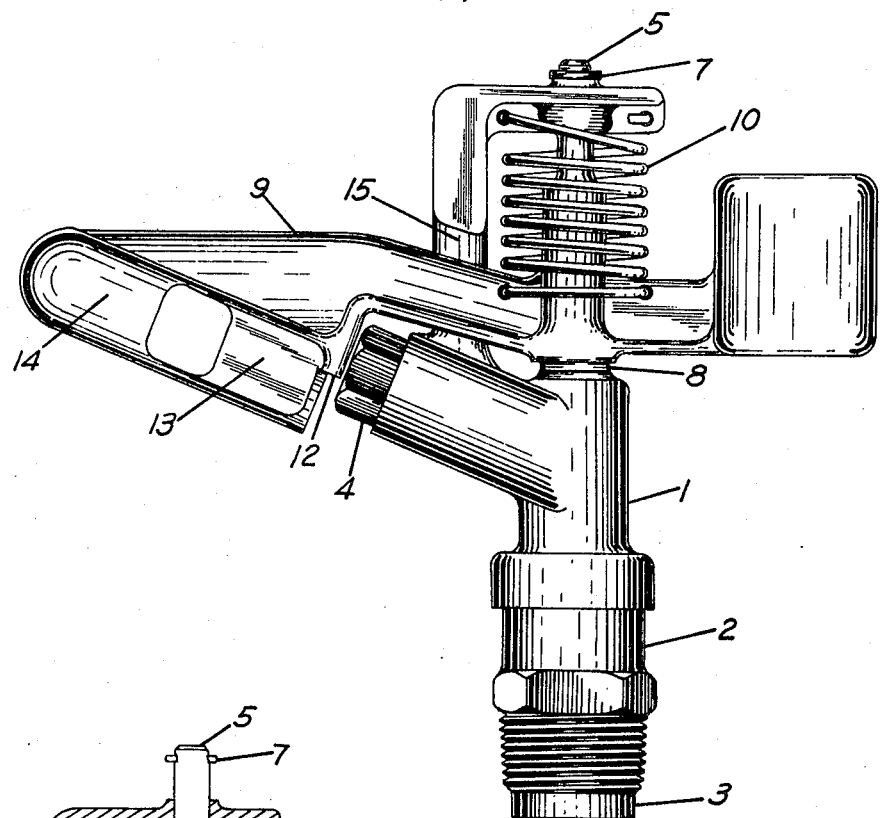
FIG. 1 is a full side view of an impact arm type irrigation head which embodies the present invention showing the arm in the inoperative position.
Figure 2:
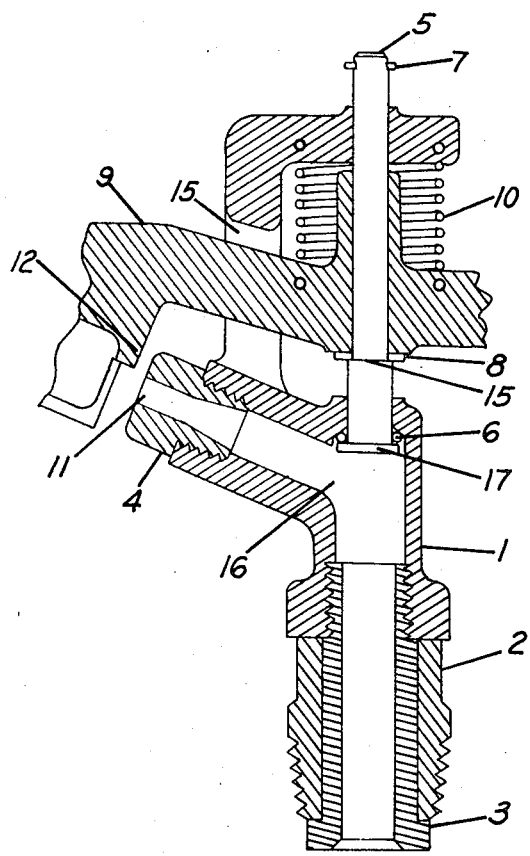
FIG. 2 is a partial vertical cross sectional view of the irrigation head with the arm and related parts shown in the operating position.

Referring to FIGS. 1 and 2 there is shown the details of an impact arm type irrigation head embodying the present invention. This type of irrigation head is well known to those skilled in the art and the following parts will be readily recognized.

Numeral 1 indicates the main body which is, by means of the bearing spindle 3, free to rotate about a vertical axis in the main bearing 2. The discharge nozzle 4 is suitably threaded into body 1. Bearing spindle 3 and body 1 have connecting passages such that water pressure supplied to the bottom opening of spindle 3 will be conducted to the discharge nozzle 4. The impact arm 9 is rotatably mounted on pivot spindle 5. As will be readily understood by those skilled in the art, in operation the rotation of the impact arm is restricted by contact with the vertical section 15 of main body 1 and by the bias spring 10.

Pivot spindle 5 is slidably fitted to body 1. Vertical motion of pivot spindle 5 relative to body 1 is limited by top retainer ring 7 and pivot spindle head 17. An O-ring 6 is fitted to the pivot spindle 5 and against the pivot spindle head 17.

Having thus described the component parts, the operation of the irrigation head can now be readily understood.

The irrigation head is installed in a vertical position by screwing the male pipe thread on main bearing 2 into a suitable water supply pipe fitting. When not in operation, pivot spindle 5 together with impact arm 9 resides in the down position shown in FIG. 1. In this condition, the vertical location of the impact arm is determined by washer 8 contacting the mating surface on body 1 and further downward motion of pivot spindle 5 is prevented by retainer ring 7. As described in this inoperative condition, the projection 12 on impact arm 9 covers the nozzle orifice 11 preventing the admission of insects or any foreign matter.

When water pressure is supplied for operation, water is conducted through the bore in bearing spindle 3, into the chamber 16 in body 1. Water pressure in chamber 16 causes pivot spindle 5 to react as a piston and be forced upward to the position shown in FIG. 2. The spindle 5, particularly that portion of said spindle adjacent to the head 17, being slidably fitted to body 1 and extending outwardly from the chamber 16, constitutes a hydraulic piston. The upward motion of pivot spindle 5 is terminated when O-ring 6 is seated against the top conical surface of chamber 16.

The raising of pivot spindle 5 simultaneously raises impact arm 9 by reason of washer 8 being moved upward by pivot spindle shoulder 15. The upward movement of the impact arm causes the projection 12 to be moved away from the nozzle orifice 11 permitting the discharge of water from nozzle 4 and rotation of arm 9.

The water jet delivered by the nozzle 4 now impinges on the vanes 13 and 14 and the impact arm is forced to rotate against the bias spring 10 until the vanes have moved out of contact with the water stream. The return of the arm by the bias spring results in an impact between the arm and the vertical surface 15 of the main body 1. This impact causes a slight angular displacement of body 1. This cycle is repeated as long as water pressure is supplied to the head and is well known to those skilled in the art.

At such time as the irrigating is completed the water supply is shut off. The absence of water pressure in chamber 16 permits spindle 5 and arm 9 to return to the condition shown in FIG. 1 from the forces of gravity and the bias spring.

It is obvious that changes may be made in the form and construction of the invention without departing from the material spirit thereof, and it is not desired to confine the invention to the exact form herein shown and described.

The invention having been thus described, that which is claimed to be new and desired to secure by Letters Patent is:

1. An irrigation head comprising, a main body, means for rotably attaching said main body to a stationary water supply conduit, a discharge nozzle, passages through said attaching means and said main body permitting a flow of water from said water supply to the discharge nozzle, an impact arm provided with vanes for the purpose of providing an oscillatory motion of said arm, a hydraulically operated piston to move said impact arm from an inoperative position to an operating position.

2. An impact type irrigation head comprising a main body, a main bearing spindle, a main bearing, a discharge nozzle, an impact arm bias means, and an impact arm pivotally mounted on a hydraulic piston, movement of said hydraulic piston from a first position to a second position causing said impact arm to move from a first position to a second position, said first position of said impact arm being such that a surface on said arm substantially covers the discharge orifice of said nozzle and said second position of said impact arm being such that the discharge orifice is suitably uncovered for operation.

3. An irrigation head comprising a main body, means for attaching said main body to a water supply conduit, a discharge nozzle, a hydraulic piston, internal passages in said main body and said attaching means forming a continous passage from said water supply conduit to said nozzle and said hydraulic piston, said hydraulic piston normally residing in an inoperative position and moving to an operative position in response to a change of pressure of the water in said water supply conduit, an arm movable by said hydraulic piston from an inoperative position to an operative position, a surface on said arm substantially covering the discharge orifice of said discharge nozzle when said arm resides in the inoperative position.

References Cited

UNITED STATES PATENTS

| | | | |
|---|---|---|---|
| 3,007,646 | 11/1961 | Gerrans | 239—230 |
| 3,204,873 | 9/1965 | Senninger | 239—230 |
| 3,315,897 | 4/1967 | Stout | 239—230 |

SAMUEL F. COLEMAN, Primary Examiner

H. S. LANE, Assistant Examiner